United States Patent

[11] 3,546,387

[72] Inventors Kurt Strunk
Graf-Eberhard;
Heinrich Halfmann, Korntal, Germany

[21] Appl. No. 696,627
[22] Filed Jan. 9, 1968
[45] Patented Dec. 8, 1970
[73] Assignee International Standard Electric Corporation
New York, N.Y.
a corporation of Delaware
[32] Priority Jan. 25, 1967
[33] Germany
[31] No. ST26406

[54] REED RELAY SWITCHING NETWORK
4 Claims, 2 Drawing Figs.

[52] U.S. Cl. .......... 179/18
[51] Int. Cl. .......... H04q 3/42
[50] Field of Search .......... 179/18.7(Y)

[56] References Cited
UNITED STATES PATENTS
3,423,537 1/1969 Schluter et al. .......... 179/18(.74)
3,458,663 7/1969 Buchner .......... 179/18(.74)

*Primary Examiner*—Kathleen H. Claffy
*Assistant Examiner*—William A. Helvestine
*Attorneys*—C. Cornell Remsen, Jr., Rayson P. Morris, Percy P. Lantzy, J. Warren Whitesel and Delbert P. Warner

ABSTRACT: A crosspoint switching method simultaneously operates all switching states. There are individual starting circuits for the crosspoint relays. A potential, emitted by a switching multiple via the positioning wires of all links connected thereto is returned by the selected switching multiple of the next following switching stage via the switching wire of the link to be used. This determines the row to be marked of the second switching multiple.

REED RELAY SWITCHING NETWORK

This invention relates to a multistage switching network of reed relay cross-points; and more particularly to telephone exchange systems in which the selection of a switching multiple prepares the reed relay cross-point for each of the switching multiples in each of the states for the simultaneous switch-through of the cross-points in all of the stages to provide the selected route. The selection of a switching multiple causes an associated switching multiple relay to operate in the selected multiple.

As used herein, a "Regular Cross-point" arrangement is an arrangement in which there is only one link between two switching multiples of two adjacent switching stages. In such a cross-point arrangement, a connecting path is selected through the entire cross-point arrangement if a suitable switching multiple is marked in each stage. Selection of links is superfluous, because there is only one single link between any two selected switching multiples in two adjacent switching stages.

In order to through-connect the selected route, it is necessary to operate the cross-point relays at the intersections of selected multiples. This relay operation can be done if the winding of each cross-point relay is actuated via two marking wires in a coordinate system electrically parallel to the switching multiples. One of these two marking wires represents the selected column and the other represents the selected row of a switching multiple. Thus, a cross-point relay operates at the intersection of the marked column and row.

The marking wires in certain known systems are selectively actuated by a marker. This can be done simultaneously in all switching stages; therefore, it is also possible to perform the through-connection simultaneously in all switching stages. This method, is usually called "parallel switching;" however, it requires a considerable expenditure in the marker. To reduce this expenditure, known systems have included markers which have marked only the rows via a marking wire. The column marking wire is marked from the preceding stage by the switching wire associated with the link connected to the selected column. The column is marked via a make-contact of a cross-point relay already operated in the preceding switching stage. Thus, the switching potential is applied to the switching wire of the link associated with the operated cross-point relay in a through-connected switch path. Because this link is connected to a defined column of a defined switching multiple in the following switching stage, no further selection is required.

A selected row of the marking wire switching multiple receives a marking potential from the marker. Thus, the cross-point relay which is to be operated is actuated by these markers which are applied in a coordinatelike manner. As soon as this relay has responded, it in turn closes its intrinsic make-contact to mark a column of a switching multiple of the next following switching stage, again the marking being applied via the switching wire of the link connected to the row of the switching multiple.

The winding of a selected cross-point relay is thus connected to the switching wire of the link connected to the respective column of the switching multiple and to the marking wire associated to the respective row of the switching multiple, at least one of these connections being made via a rectifier which is individual to the cross-point.

In larger sized cross-point arrangements, it may be a disadvantage to have the switching performed only in steps because the time required for the switching process is increased with the number of the switching stages.

The switching process can be accelerated without a higher expenditure in markings by a serial switching method which is also known to the art. In this method, the windings of all selected cross-point relays are series-connected via auxiliary wires of the links used to establish the connection. When applying suitable potentials to the series circuit, all cross-point relays respond simultaneously. However, the serial connection of the cross-point relay windings is not always desired. This is particularly true in larger sized cross-point arrangements because the entire series of starting circuit has a high inductivity; therefore, the switching process is again slowed down.

In yet another known system, it is possible to use cross-point relays with one-only winding. In such a circuit arrangement, a holding circuit is formed for parallel switching, serial switching, and step-by-step switching of the cross-point relays to be used to establish a connection. The holding circuit extends across all switching stages in which the windings of all cross-point relays are connected in series via their own make-contacts and via the switching wires of the links.

However, there are also known cross-point arrangements in which the holding circuits for the cross-point relays are formed in sections from stage to stage. A switching relay is required in each line, and this relay responds within the holding circuit of an excited cross-point relay and then applies, via its contact, a holding potential to the switching wire of a link leading to a succeeding switching stage. The holding potential is thus translated in each switching stage by a switching relay.

To provide, simultaneous switching in all switching stages with little expenditure for the marking, an individual circuit may be provided for each cross-point relay which is to be excited. Here a route-searching network which simulates the link network is used. All route-searching wires simulating a selected switching multiple start from a marking node. Each receives an access potential serving the route search. Of these route-search wires carrying the access signal, only one can lead to the marking node in a regular cross-point arrangement. The same is true in the simulated network. By testing the route-search wires leading to the marked node, it is possible to identify the link which connects the selected switching multiples of two adjacent switching stages. With this, the column of one switching multiple and the row of the other switching multiple are also determined. As these items of information can be derived from the route-searching network, the expenditure in the marker is small. However, this proposed circuit arrangement cannot be applied in cross-point arrangements with an overall holding circuit for all switching stages or in cross-point arrangements in which route-search methods are used.

Accordingly, an object of the present invention is to provide a circuit arrangement in which all cross-point relays participating in a connecting path can be excited simultaneously through individual starting circuits, independently of the route-searching method used and independently of how the holding circuit is formed. Another object is to accomplish this without requiring an increased expenditure for the marking process.

According to the invention, these objects are accomplished by connecting one of two terminals of the winding of each cross-point relay with the switching wire of the link connected to the respective switching multiple column. The other terminal is connected indirectly or directly via an intrinsic make-contact to the switching wire of the link associated with the concerned switching multiple row. That same other terminal is also connected to a rectifier which is individually associated to each cross-point, and to the marking wire representing one of the switching multiple rows. An excited switching multiple relay applies a potential to one positioning wire of all links connected to the columns of the associated switching multiple, and due to a potential on a positioning wire of a link, to a row of the associated switching multiple. This initiates an application of a potential of the same value to the switching wire of the same link and to the marking wires associated with the row of the switching multiple. The potentials applied to the positioning wires of succeeding switching stages are mutually staggered at least by the value of the responding voltage for a cross-point relay.

The above-mentioned and other features and objects of this invention and the manner of obtaining them will become more apparent, and the invention itself will be best understood by reference to the following description of an embodiment of the invention taken in conjunction with the accompanying drawings, in which.

Figure 1:
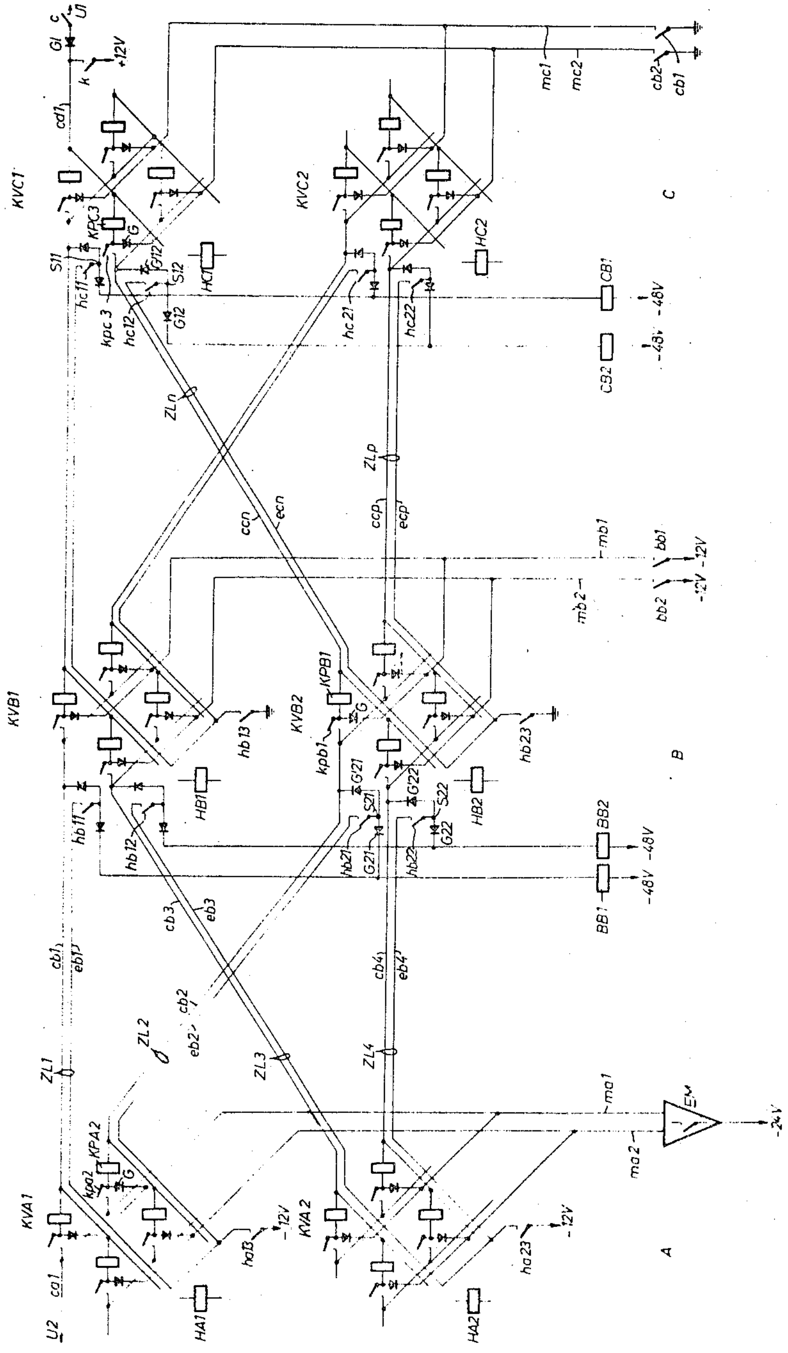
FIG. 1 shows a first example.

FIG. 1 shows part of a cross-point arrangement. There are two exemplary switching multiples in each of three switching stages, viz.: switching multiples KVA1 and KVA2 of Stage A switching multiples KVB1 and KVB2 of the stage B, and switching multiples KVC1 and KVC2 of stage C. A switching multiple relay (HA1 to HC2) is associated with each switching multiple.

The multiple relay is actuated when the associated switching multiple is selected during the route-search. It is assumed that the switching multiples KVC1 and KVB2, and KVA1 have been selected. Thus, the relays HC1, HB2, and HA1 are excited. Markings of −12 volts are applied to all links starting from the switching multiple KVA1 and leading to the switching stage B, as via contact *ha*13. In stage B, the contact *hb*21 and *hb*22 of relay HB2 connect the positioning wires of all links, leading from stage A to the selected switching multiple KVB2, to the marking relays BB1, BB2. Relay BB1 is associated with all first input rows of the switching multiples of the stage B, relay BB2 is associated with all second input rows of the switching multiples of the stage B in common. A switching multiple may of course have more than two inputs; therefore, more marking relays must be provided.

Since the link ZL2, comprising the positioning wire *eb*2, is connected to the first input row of the switching multiple KVB2, the wire *eb*2 is connected to the marking relay BB1 via contact *hb*21. The marking relay operates over the circuit traced from −48 volts through the winding of relay BB1, rectifier G21, row-individual point S21, contact *hb*21, positioning wire *eb*2, and contact *ha*13 to −12 volts. The potential of −12 volts which is applied via the positioning wire *eb*2 of the link ZL2 and the contact *hb*21 to the row-individual point S21, associated with the first row of the switching multiple, KVB2, is also applied, via rectifier G'21, to the switching wire *cb*2 of the link ZL2. Thus, the potential of −12 volts applied to the positioning wires of the links ZL1 and ZL2 via contact *ha*13 returns to the switching multiple KVA1 via the switching wire *cb*2 of the link ZL2, which is used to establish the connection. This potential is returned as a cross-point potential, marking the second column of the switching multiple KVA1.

It is assumed that the switching stage A is the first switching stage and that the subscriber circuit initiating the connection is connected to the first row of the switching multiple KVA1. A marking potential of −24 volts is applied to the associated marking wire *ma*1. This wire *ma*1 is in common with all first rows of the switching multiples of the switching stage A. Thus the following starting circuit is established for the cross-point relay KPA2 of the switching multiple KVA1:−24 volts, terminal-marker EM, marking wire *ma*1, rectifier G, winding of the cross-point relay KPA2, switching wire *cb*2, rectifier G'21, row-individual point S21, contact *hab*21, positioning wire *eb*2, and contact *ha*13 to −12 volts. Because a cross-point relay is actuated at a voltage of less than 12 volts, the cross-point relay KPA2 operates.

Contact *hb*23 applies ground potential in an analogous manner to the positioning wires *ecn* and *ecp* of the links ALN and ZLP. The ground return is via contact *hc*12, row-individual point S12, rectifier G'12, and the switching wire *ccn* of the link ZL*n*, to the switching multiple KVB2, thereby marking its first column. As already described, the marking relay BB1 of the switching stage B has been excited. A marking potential of −12 volts is applied to the marking wire *mb*1 via contact *bb*1. This marking wire *mb*1 is associated in common with all first rows of the switching multiples of the switching stage B.

Thus, a responding circuit is closed in the switching stage B for only the cross-point relay KPB1 of the switching multiple KVB2, the circuit being traced, as follows:

12 volts, contacts *bb*1, conductor *mb*1, rectifier G, relay winding KPB1, conductor *ccn*, rectifier G'12, row-individual point S12, *ecn*, and contacts *hb*23 to ground potential.

Marking relay CB2 operates responsive to the ground potential which reaches it through row-individual point S12 and contact *hc*12, which are associated in common with the second rows of the switching multiples KVC1–KVC2, the common connection being via rectifier G12. The marking relay CB2 closes its contact *cb*2 to apply ground as a marking potential to the marking wire *mc*2 associated with the same rank of rows. "Rank" refers to the row number; for example, the top row would be the first rank, the second row from the top would be the second rank, etc.

It is assumed that the switching stage C is the final switching stage and that the connection must be established to a unit which is connected to the first column of the switching multiple KVC1. For example, this unit may be a junctor. To mark this output, contact *k* is closed to apply a potential of +12 volts to the switching wire *cd*1. The cross-point relay KPC3 responds in the circuit formed by: ground potential, contacts *cb*2, wire *mc*2, rectifier G, winding KPC3, wire *cd*1, and contacts *k* to +12 volts.

The processes described above are carried out simultaneously in all switching stages. Thus, the crosspoint relays KPA2, KPB1, and KPC3 are excited at the same time through circuits which are independent of each other. Thereupon, the marker can be released and the relays HA1, HB2, HC1, BB1 and CB2 drop.

The number of switching stages, switching multiples, and switching relays described herein is selected to give the example. The invention can also be applied to an arbitrary arrangement of the switching grid, if no more than one link exists between two switching multiples of two adjacent switching stages.

After they have responded, a holding circuit is formed for the cross-point relays, the holding circuit extending across all switching stages, as follows:

Battery U2, conductor *ca*1, contacts *kpa*2, winding KPA2, conductor *cb*2, contacts *kpb*1, winding KPB1, conductor *ccn*, contacts *kpc*3, winding KPC3, conductor *cd*1, rectifier G1, and contacts *c* to battery U1.

The potentials U1 and U2 are selected so that, in the holding circuit, a negative potential prevails on the switching wire *cd*1. A ground potential is used as a marking potential of stage C. In analogy, a negative potential prevails on the switching wire *ccn* against −12 volts and on the switching wire *cb*2 against −24 volts. During the marking process, after a cross-point becomes busy, the rectifiers G are blocked at all operated cross-point relays giving access to the busy connecting path.

Figure 2:
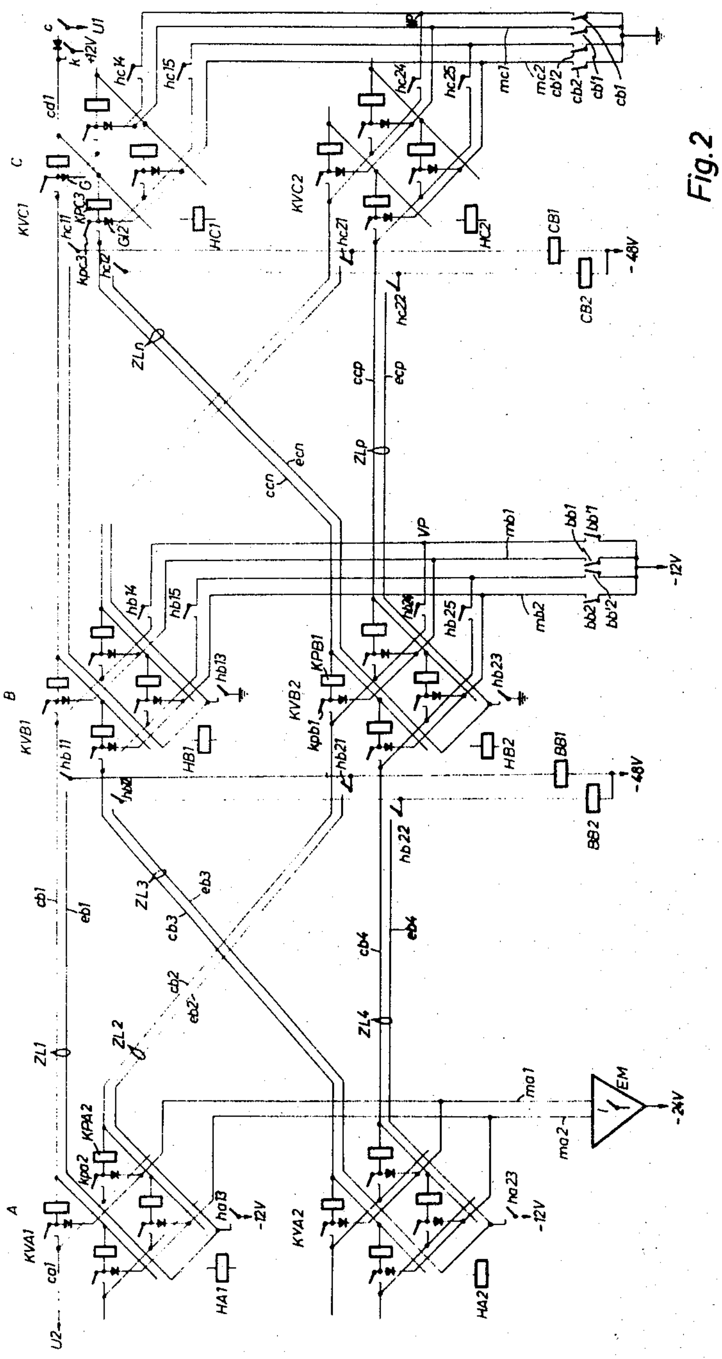
FIG. 2 shows a second example of the circuit arrangement according to the invention.

In FIGS. 1 and 2, all similar elements are designated by the same reference character. Compared to FIG. 1, in the circuit arrangement of FIG. 2, the rectifiers G22, G'22 and G12, G'12 etc., individually associated with the switching multiple rows, are omitted. The potential of −12 volts arriving via a link or positioning wire, e.g. *eb*2, is again used to excite the marking relay BB1. The positioning wire is switched to the marking relay BB1 via contact *hb*21. As always the switching potential −12 volts applied to the positioning wire *eb*2 and returned via the switching wire *cb*2 is equal to the marking potential which is applied to the marking wire *mb*1.

Control is by the marking relay BB1. Another contact *bb'*1 of the marking relay BB1 may be used to apply a potential of −12 volts to the switching wire *cb*2.

In FIG. 2 the switching wires of the links ZL1 and ZL2 or ZL3 and ZL4, respectively, are led to equal ranking rows of the switching multiples KVB1 and KVB2. These links are always concentrated via contacts *hb*14, *hb*24, or *hb*15, *hb*25 of the individually associated switching multiple relays HB1, HB2. The links are connectable via a contact of the marking relay BB1 or BB2, associated respectively with the same rank of rows, to a marking potential −12 volts. Particularly, the switching wire *cb*2 is connected via contact *hb*24 and the switching wire *cb*1 via contact *hb* 14 with a multiple point VP which receives a marking potential of −12 volts via contact *bb'*1. Under the conditions explained with the aid of FIG. 1, relay HB2 is excited and consequently only the switching wire *cb*2 is through-connected to the multiple point VP. When the marking relay BB1 responds, the marking wire *mb*1 (row marking for switching multiple KVB2) receives a −12 volts potential via contact *bb*1. On the other hand, the switching wire *cb*2 (column marking for the switching multiple KVA1) receives the voltage wire contact *bb*'1. Eventually, the contact *bb*1 may be used to apply a −12 volts potential to the marking wire *mb*1 as well as to the multiple point VB. The multiple point is then electrically the same as the marking wire *mb*1.

The circuit arrangement for the switching stage C and the processes are essentially the same as those already explained with the aid of FIG. 1. The holding circuit, is also equal to the holding circuit explained for FIG. 1. The potentials at each of the contacts K*pa*2, K*pb*1 and K*pc*3 are the same as the potentials prevailing at both terminals.

This is essential. Otherwise, when closing one of these contacts, a short circuit would occur at a time in which the switching multiple relays or marking relays are still in operation (i.e. before the marker has been released).

The switching method demonstrated with the aid of FIG. 1 may also be used, without modifications, for cross-point arrangements in which the holding circuit for the cross-point relays is established step-by-step through link relays. The switching wire (connected e.g. to contact *kpb*1 is then interrupted. The winding of a link relay in series with this contact receives a potential through its free end. A contact of this relay applies a holding potential to the switching wire *cb*2 when the relay responds. The circuit arrangement must then be constructed in analogy for each other link.

While the principles of the invention have been described above in connection with specific apparatus and applications, it is to be understood that this description is made only by way of example and not as a limitation on the scope of the invention.

We claim:

1. A control circuit for simultaneously switching a plurality of cross-points forming a selected path through a multistage regular cross-point arrangement wherein: each stage has a plurality of switching multiples using reed relay cross-points
  said reed relays having only one winding;
  said multiples each comprising rows and columns, there being a reed relay at intersecting ones of said rows and columns;
  said control circuit comprising switching multiple relays individually associated with each of said multiples;
  said switching multiple relays being operated when the associated multiple is in the selected path;
  link means coupling the multiples of each stage to the multiples of the succeeding stage;
  each of said link means comprising a switching wire and a positioning wire;
  said switching wire extending between the column of the multiples of the preceding stages to the rows of the multiples of the succeeding stages;
  the winding of each reed relay being connected at one of its two terminals to the switching wire of the link which is connected to the column in which the relay cross-point is located;
  marking means in each of said stages for applying a potential to selected rows of said multiples in said stages;
  said marking means comprising marking wires;
  means for applying marking potentials to said marking wires;
  means for connecting the second terminal of said reed relays to said marking wires;
  said means for applying the marking potential to said marking wires including a plurality of marking relays;
  first contact means in each stage except the last stage operated responsive to the associated switching multiple relay for operating first contacts in the associated switching multiple to apply a potential to the positioning wires of all of the links associated with the multiple;
  second contact means in each multiple of each stage operated responsive to the operation of said switching multiple relay for applying the potential received over said positioning wire to operate the marking relay means and thereby apply the marking potential to said marking wire;
  means responsive to the operation of said second contact means for applying the potential received over said positioning wire of one of said links to the switching wire of the same link to thereby apply an operating potential difference across the winding of the reed relay at the cross-point in the selected multiple; and
  means in said last stage for applying a potential to the reed relay of the selected cross-point sufficient to operate the reed relay therewith and the potential supplied to succeeding positioning wires being different by a value equal to the potential required for operating the reed relay cross-points.

2. The circuit arrangement according to claim 1, wherein: there is one of said plurality of marking relays common to all equal ranking switching multiple rows of a switching stage;
  contact means operated by row; operation of the said one marking relay for applying the marking potential to said marking wire coupled to said row; and
  said marking relay being operated responsive to the potential on said positioning wires connected with the marking relay.

3. The circuit of claim 1, wherein said second contact means through-connects the positioning wire of a link to a row-individual point, each of said row-individual points being connected via decoupling means to the switching wire of the link connected to the respective row, and, to the marking relay, associated with a respective rank of rows.

4. The circuit arrangement of claim 1, wherein within the switching stages the incoming switching wires of all links are connected to equal ranking switching multiple rows of different switching multiples, said connection being via said second contact means, said second contact means comprising make-contacts of the switching multiple relays individually associated through the switching multiple rows to a multiple point which can be connected to the marking potential via a contact of the marking relay associated with the same rank of rows of the switching multiple.